United States Patent

[11] 3,618,013

| [72] | Inventors | Günter Hans Ziehm<br>Kiel;<br>Karl-Friedrich Triebold, Bremen; Siegfried Franz Heinrich Drischel, Duisburg, all of Germany |
|---|---|---|
| [21] | Appl. No. | 7,054 |
| [22] | Filed | Jan. 30, 1970 |
| [45] | Patented | Nov. 2, 1971 |
| [73] | Assignee | Fried. Krupp Gesellschaft mit beschrankter Haftung<br>Essen, Germany<br>Continuation-in-part of application Ser. No. 777,806, Nov. 21, 1968, now Patent No. 3,496,527. |

[54] TRANSDUCER FOR DETERMINING THE ANGLE OF INCIDENCE OF SOUND WAVES
9 Claims, 4 Drawing Figs.

| [52] | U.S. Cl. | 340/10 |
|---|---|---|
| [51] | Int. Cl. | H04r 17/00 |
| [50] | Field of Search | 340/10 |

[56] References Cited
UNITED STATES PATENTS

| 2,795,709 | 6/1957 | Camp | 340/10 UX |
|---|---|---|---|
| 3,043,967 | 7/1962 | Clearwaters | 340/10 UX |
| 3,177,382 | 4/1965 | Green | 340/10 X |
| 3,302,163 | 1/1967 | Andrews, Jr. | 340/8 |

*Primary Examiner*—Rodney D. Bennett, Jr.
*Assistant Examiner*—Brian L. Ribando
*Attorney*—Spencer & Kaye ABSTRACT: A transducer for converting sound vibrations into electrical signals for determining the angle of incidence of sound waves. The transducer is constructed in the shape of a hollow cylinder. It has four means, spaced at 90° intervals around the hollow cylinder, each of which produces an electrical signal that is dependent on mechanical vibrations of a portion of the hollow cylinder and being connected two by two in opposed series, each pair of which is sensitive to oscillations in only a limited angular region around the hollow cylinder, and throughout this angular region, the sensitivity of each pair is varied. The difference signals, formed from the signals produced by each two oppositely arranged means connected two by two, are thus made independent of the harmonics which are a function of the angle of incidence of the waves.

INVENTORS.
Günter Hans Ziehm
Karl-Friedrich Triebold
Siegfried Franz Heinrich Drischel BY Spencer & Kaye

ATTORNEYS.

TRANSDUCER FOR DETERMINING THE ANGLE OF INCIDENCE OF SOUND WAVES

CROSS-REFERENCE TO RELATED APPLICATION

This application is a continuation-in-part of application Ser. No. 777,806, filed Nov. 21, 1968, Now U.S. Pat. No. 3,496,527, issued Feb. 17, 1970 to the present applicants.

BACKGROUND OF THE INVENTION

The present invention relates to directional sensitive sound-receiving transducers, such as sonar transducers used for detecting sound waves in water. More particularly, the present invention relates to sound-receiving transducers which are small or, at most, comparable in size with the wave lengths received and which include four receiving assemblies spaced at 90° intervals about a central axis.

After the development, in the ratio art, of direction-finding crossed coil antennas of the type which are small compared to the wave lengths of the radio waves to be received, acoustic receiving arrangements were also constructed, particularly in the sonar art, which operate with two perpendicularly crossed receiver systems of identical sensitivity. Such receivers produce two electrical voltages at a pair of outputs having amplitudes in the ratio, one to the other, of cosine $\gamma$/sine $\gamma$, where $\gamma$ is the angle of incidence of sound waves with respect to one of the two systems.

It is common practice, in the case of such sound-receiving transducers to arrange two identically sensitive receivers in each of the two crossed directions spaced apart a distance equal to or less than the wave lengths to be received and connected together so that the directional sensitivity exhibited by their output voltages will have the characteristic of a FIG. 8. It is also usual to apply the pair of output voltages, with corresponding amplification, if necessary, to the crossed deflection systems of a cathode ray tube so as to display a line on the screen of the tube which is likewise inclined at the angle $\gamma$ with respect to the preferred deflection axis of the tube. This deflection line will extend outward in both directions from the center of the screen.

If it is desired to have the deflection line extend outward from the center of the screen in one direction only, to make the display easier to read, it is common practice to provide an additional receiving transducer in the center of the two crossed receiver systems. This transducer produces a "center voltage" which, though shifted in phase by −90° with respect to the difference voltages, can be phase matched to the difference voltages by shifting its phase by +90°. After passing the phase-matched voltage through a clipping amplifier which converts it to a series of pulses, the signal is applied to a Wehnelt control electrode of the cathode ray tube to interrupt the electron beam during the signal period in which the signal beam, if uninterrupted, would form the portion of the deflection line which extends outward from the center of the screen in the direction opposite to the direction corresponding to the direction of incidence of the sound waves.

It is also possible to darken the appropriate side of the deflection line without the use of an additional centrally located receiving transducer by connecting together the outputs of the external receiving transducers in the following manner: The two pairs of transducers arranged diametrically opposite each other are each connected in a noninteracting manner to a difference network or difference amplifier, while all four transducers are connected in a noninteracting manner to a summing network or summing amplifier. The two difference signals, so produced, are then supplied to the cathode-ray tube to provide the deflection in the two orthogonal axes while the summed signal is connected as described above, to eliminate that half of the deflection line which extends from the center of the screen in a direction opposite to that representing the direction of incidents of the sound waves.

The prior art receiver arrangements described above have the disadvantage, however, that they require the use of either four or five individual receiving transducers.

SUMMARY OF THE INVENTION

An object of the present invention, therefore, is to provide a single sound receiving transducer which is capable of producing the various voltages of the prior art receiver arrangements described above.

This object, as well as other objects which will become apparent in the discussion that follows, is achieved, according to the present invention, by providing a sound-receiving transducer in the form of a hollow cylinder and providing four means, spaced at 90° intervals around the hollow cylinder, that produce an electrical signal in dependence upon mechanical vibrations of a portion of the hollow cylinder. Said means are connected two by two in opposed series and each pair is sensitive to oscillations in only a limited angular region around the hollow cylinder, and throughout this angular region the sensitivity is varied.

The resulting transducer is then connected in the manner of the prior art receiver arrangements which employ four or five separate transducers. The two pairs of oppositely arranged means are connected to form difference signals from their respective electrical signals. By properly varying the sensitivity of the signals producing means, in a manner to be described in detail below, the difference signals are made independent of the harmonics which are a function of the angle of incidence of the sound waves.

The present invention is applicable to electrostrictive hollow cylinder receiving transducers made, for example, of lead, zirconium titanate or barium titanate. The prevailing sound pressure field is obtained from the electrostrictive transducer in the form of an electrical voltage with individual metallic electrodes. These individual electrodes are electrically connected into four groups, each group displaced by 90° from the adjacent groups, and each covering a segment of the hollow cylinder. According to the invention, the electrodes of each group are arranged unevenly around the segment covered by the group.

The present invention can, in fact, be applied to any type of hollow cylinder sound receiving transducer which employs means to convert mechanical vibrations in separate segments of the cylinder into electrical signals. These means can be realized, for example, by capacitor plates in an electrostatic transducer.

According to the invention, the means are combined two by two for producing the electrical signals with each pair having a varying sensitivity around the segments of the hollow cylinder in which they are operative. These variations in sensitivity can be calculated with the object in view that the difference signals, formed from the signals produced by each two oppositely arranged means, become independent of the harmonics which are a function of the angle of incidence of the sound waves.

The sound waves propagating in the medium surrounding the hollow cylinder receiving transducer excites the hollow cylinder into forced oscillations which are comprised of a fundamental oscillation and a number of higher spatial harmonics. The voltage generated, for example, between two adjacent electrostrictive electrodes at the point $\nu$ on the hollow cylinder by an incident sound wave of angular frequency $\omega$ (radians) is given by the expression $$V_\nu = A \cos \omega t \sum_{K=0}^{\infty} a_K \cos K(\gamma - \alpha_\nu)$$

where:

$A = g_E \cdot p$.

$g_E$ = electroacoustical conversion constant (voltage sensitivity) of the sound receiving transducer in volts per microbar.

$p$ = amplitude of the alternating pressure of the incident sound wave in microbars.

$K = 0, 1, 2, \ldots$ = the characteristic factor the particular Kth of $a_K$ = amplitude factor of the Kth harmonic.

γ = the angle between the radius of reference of the transducer and the direction of incidence of the sound waves.

α = angle between the radius of reference of the transducer and a radius extending to a point $\nu$ on the hollow cylinder. In the case of the electrostrictive or electrostatic transducer this point $\nu$ is the point midway between two particular electrodes in question.

If two identical electrode groups which are displaced by 180° and arranged symmetrically with respect to the radius of reference of the transducer are connected together to form a difference voltage $V_D$; the portion $V_{DK}$ thereof which is dependent upon the Kth harmonic at the angle of sound incidence γ will equal zero for even values of K and when K is odd:

$$V_{DK} = A \cdot \cos \omega t \cdot 2a_K \cdot \cos K\gamma \cdot \sum_{\nu=1}^{n} W_\nu \cos \alpha_\nu$$

where $W_\nu = 1$ for an electrostrictive hollow cylinder transducer, and $n$ equals the number of points $\nu$ for a single signal producing means.

To shorten this expression, $$\sum_{\nu=1}^{n} W_\nu \cos K\alpha_\nu$$

is set equal to $b_K$. $b_K$ is the electrostrictive group factor for the Kth harmonic at an angle of sound incidence γ.

As a result of the present invention, the disturbing portion $V_{DK}$ of the difference voltages $V_D$ which are dependent upon the harmonic of the angle of sound incidence γ may be eliminated or at least be reduced in magnitude since, by suitable choice of $W_\nu$ and $\alpha_\nu$ or $\alpha_0$, the summation in the expression for $V_{DK}$ can be made equal to 0 or at least be made small compared to the summation at $K=1$.

DESCRIPTION OF THE PREFERRED EMBODIMENTS

Figure 1:
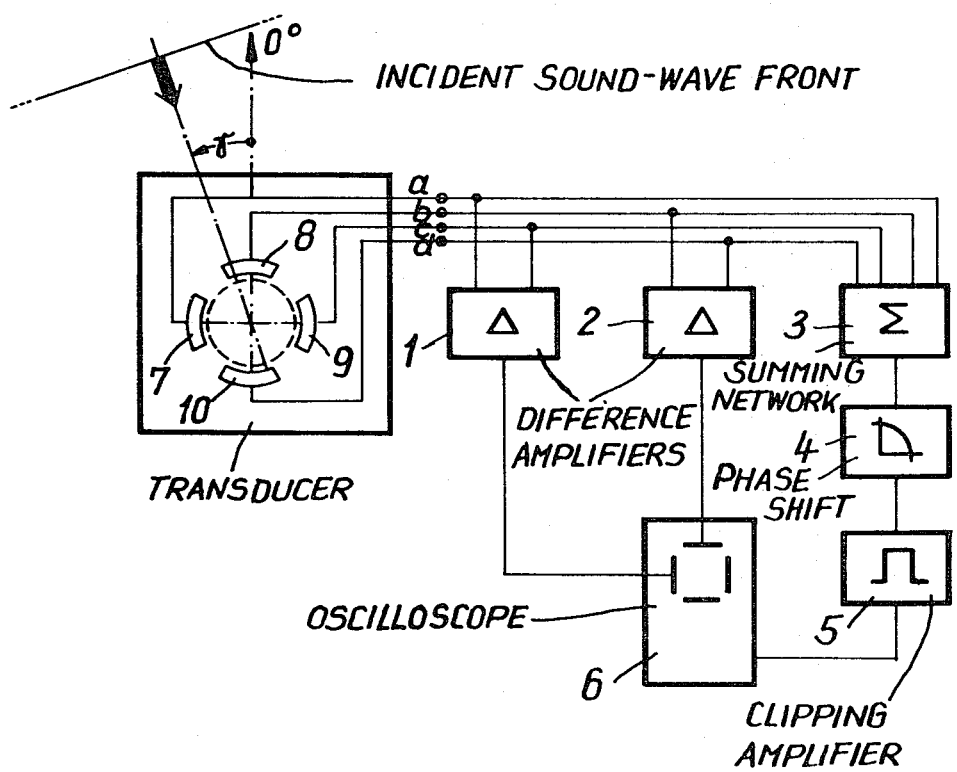
FIG. 1 is a schematic diagram of sonar receiving and display apparatus suitable for use with the receiving transducer of FIGS. 2 and 3 as well as with four individual transducers of the prior art.

FIG. 1 schematically illustrates apparatus which may be used with the hollow cylinder receiving transducers according to the present invention to display the direction of propagation of incident sound waves. The four separate section 7, 8, 9 and 10 of the transducer produce signal voltages of equal magnitude for equal amplitudes of acoustic vibrations. The difference between the voltages produced by diametrically oppositely oriented sections of the transducer is obtained by the difference networks or difference amplifiers 1 and 2. The voltages produced by all the sections of the transducer are added in the summing network or summing amplifier 3. Neither the difference elements 1 and 2 nor the summing element 3 permits the voltage produced by one of the sections of the transducer to react or cause a change in the voltage produced by any of the others.

The phase of the sum voltage produced by the summing element 3 is displayed by a factor of $-\pi/2$ with respect to the phase of the two difference voltages. This is corrected by a phase-shifting element 4 so that the sum voltage and the difference voltages will have the same phase. It should be noted that if the sum voltage were shifted in phase with respect to the difference voltages by $+\pi/2$ this phase match could be accomplished by inserting phase shifting elements in the difference voltage channels. Likewise, if the signs of the phase in the sum voltage and in the difference voltage channels were opposite, the phase matching could be accomplished by means of appropriate phase shifting elements in all the channels.

The difference voltages, the amplitudes of which are proportional to the cosine and sine, respectively, of the angle of incidence γ of the sound waves, are applied to the X and Y axis deflector systems of the cathode ray tube 6. The sum voltage is passed through a clipping amplifier 5 and applied to the Wehnelt control electrode of the cathode ray tube to inhibit the electron beam when it is directed along that portion of the line on the screen at the angle γ+180°. As a result, the line displayed on the screen of the tube will extend outward from the center of the screen in one direction only at an angle γ from the reference axis of the tube.

Figure 2:
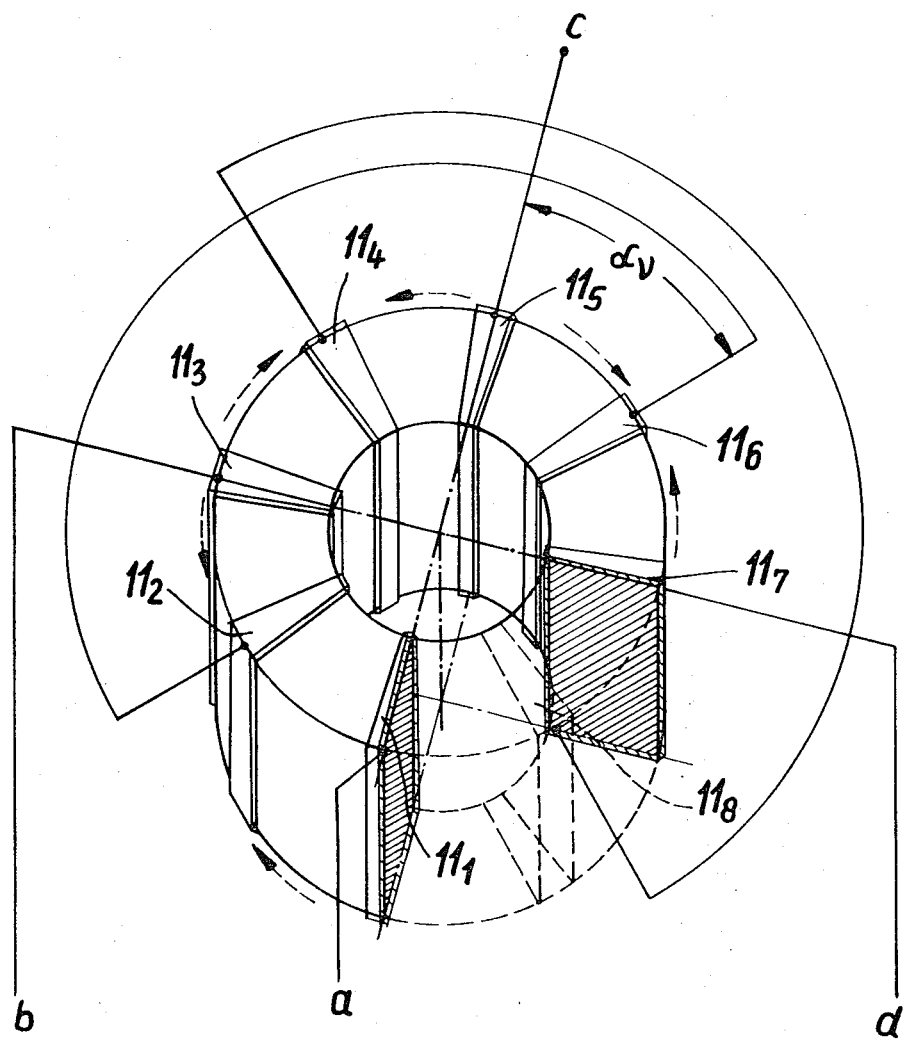
FIG. 2 is a cutaway schematic diagram, in perspective, of an electrostrictive hollow cylinder receiving transducer according to the present invention, having eight metal plates.

FIG. 2 shows a partially cut away view of a directional sensitive sound receiving transducer having a hollow cylindrical body made of electrostrictive material. This body is provided with eight metal strips $11_1-11_8$ which serve as electrodes. Each of these metal strips surrounds the wall of the hollow cylinder in its particular angular region. These electrodes may be used to impress a permanent circular polarization to the hollow cylindrical body.

Figure 3:
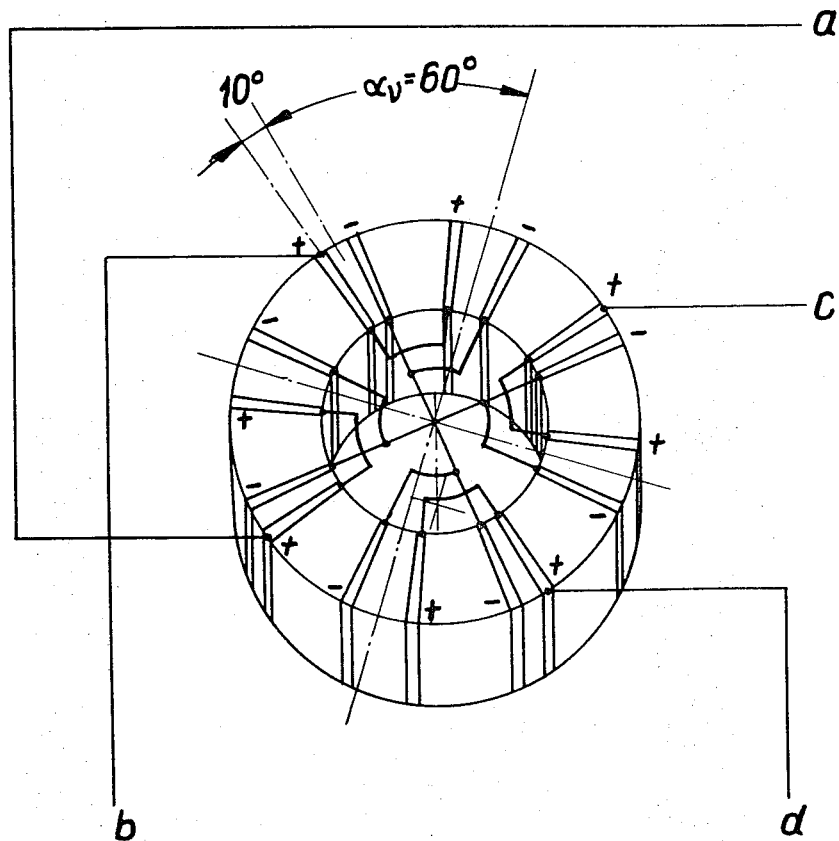
FIG. 3 is a schematic diagram, in top view, of an electrostrictive hollow cylinder receiving transducer according to another preferred embodiment of the present invention having embedded electrodes.

FIG. 3 illustrates another embodiment of the electrostrictive or electrostatic hollow cylinder transducer according to the present invention. This transducer is provided with electrodes extending parallel to the axis of the hollow cylinder to produce the circular polarization. These electrodes extend, in the axial direction, the full height of the cylinder; in the radial direction they extend the full thickness of the wall.

The number of electrodes, the angle $\alpha_\nu$ from the reference radius of the cylinder to the radius passing through the center of the utilized space between the electrodes, and the circuit for connecting the individual electrodes into four identical electrode groups, each displaced by 90° around the hollow cylinder, are chosen, so that according to:

$$b_K = \sum_{\nu=1}^{n} \cos K\alpha_\nu$$

the group factors will be $b_1=3.26$; $b_3=0$; $b_5=0.6$; $b_7=-1.29$; and $b_9=0$.

For reasons of clarity, the circuit connection between the electrodes is shown in FIG. 3. The angles $\alpha_\nu$ to the centers of the intermediate spaces between the electrodes of an electrode group are 60° to reduce the third harmonic.

Figure 4:
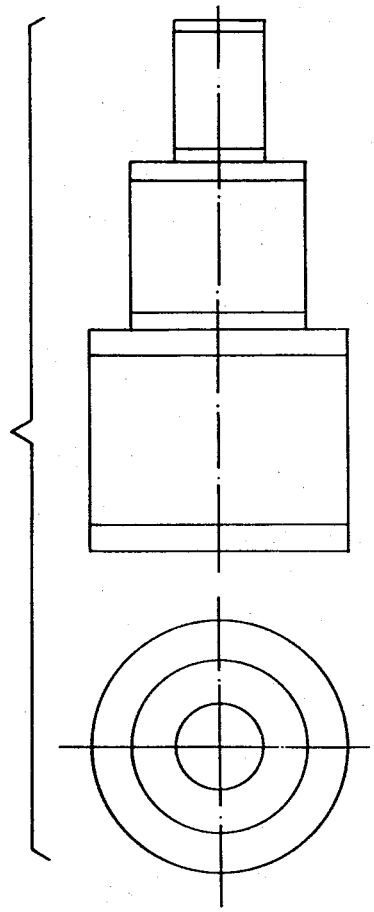
FIG. 4 is a schematic diagram, in elevation and in top view, of a receiving column consisting of three hollow cylinders receiving transducers of different diameters.

It will be understood that the above description of the present invention is susceptible to various modifications, changes and adaptations, and is not limited to the particular examples shown and described. In particular, if it is necessary to cover a broad range of frequencies, it is possible to employ a plurality of receiving transducers of differing diameters arranged together, as shown in FIG. 4. It may be necessary to employ individual preamplifiers with each transducer since the larger transducers will clearly exhibit a higher sensitivity. For higher frequencies, however, the large transducer will no longer be small in size compared with the wave length of the sound.

The present invention is applicable, in fact, to every type of microphone effect transducer where mechanical movements or stresses are converted to electrical currents or voltages.

We claim:
1. In a sound-receiving transducer for determining the direction of propagation of incident sound waves which includes a hollow cylinder, the improvement comprising four electrode group means for producing an electrical signal in dependence upon mechanical oscillations of said hollow cylinder, each of said means being arranged at 90° intervals around said hollow cylinder so that each of said means is receptive to oscillations in a definite angular region around said hollow cylinder, each of said electrode group means comprising a pair of electrodes each defining the outer surface of a respective one of said definite angular regions and interconnected in opposed series, the spacing of the electrodes in each pair of electrodes being different, so that each pair of electrodes measures the oscillations in its respective angular region with a different sensitivity at different points around the region.

2. The transducer defined in claim 1, wherein said electrodes are metal plates.

3. The transducer defined in claim 2 wherein said metal plates pass through a wall portion of said hollow cylinder.

4. The transducer defined in claim 3, wherein said electrodes extend in directions parallel to the axis and radii of said hollow cylinder, said electrodes extending at least to the radial edges of said hollow cylinder in the axial direction and at least to the inner and outer circumferential edges of said hollow cylinder in the radial direction.

5. The transducer defined in claim 1, wherein said electrodes are metal strips surrounding a wall portion of said hollow cylinder.

6. The transducer defined in claim 1, wherein said hollow cylinder is constructed from an electrostatic material.

7. The transducer defined in claim 1, wherein there are $n$ angles $\alpha_\nu$ between a reference point on the circumference of the hollow cylinder and points $\nu$ on the circumference which are midway between the electrodes of a group of interconnected electrodes and are chosen so that the value $$\sum_{\nu=1}^{n} \cos K\alpha_\nu$$

for all $K$ other than $K=1$ will be at least substantially less than the value $$\sum_{\nu=1}^{n} \cos \alpha_{\nu'}$$

where $K$ is an integer.

8. The transducer defined in claim 1 wherein said hollow cylinder is constructed from an electrostrictive material.

9. The transducer defined in claim 1, comprising a plurality of said sound receiving transducers of different diameter joined together on a common axis to form a single unit.

* * * * *